(12) United States Patent
Zhou et al.

(10) Patent No.: US 11,030,078 B1
(45) Date of Patent: Jun. 8, 2021

(54) SYSTEMS AND METHODS FOR DIGITAL CONTENT TESTING

(71) Applicant: Facebook, Inc., Menlo Park, CA (US)

(72) Inventors: Peihua Zhou, Singapore (SG);
Matthew Shaer, London (GB);
Prabhjot Singh, Sunnyvale, CA (US);
Adam Stevens, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/454,983

(22) Filed: Jun. 27, 2019

(51) Int. Cl.
*G06F 11/36* (2006.01)
*H04N 21/81* (2011.01)

(52) U.S. Cl.
CPC ...... *G06F 11/3664* (2013.01); *G06F 11/3672* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 7,020,573 B2* | 3/2006 | Wheeler | ............. | H04L 12/2809 702/117 |
| 7,975,000 B2* | 7/2011 | Dixon | ................ | G06Q 30/0254 709/203 |
| 8,555,253 B2* | 10/2013 | Shufer | ................ | G06F 11/3668 717/125 |
| 8,688,522 B2* | 4/2014 | Gern | .................. | G06Q 30/0276 705/14.72 |
| 8,788,885 B1* | 7/2014 | Cook | .................. | G06F 11/3668 714/38.1 |
| 9,002,729 B2* | 4/2015 | Natoli | .................... | G06Q 30/02 705/14.43 |
| 9,118,542 B2* | 8/2015 | Srivastava | ............ | G06F 16/955 |
| 9,164,874 B1* | 10/2015 | Tomay | ................ | G06F 11/3672 |
| 2007/0073581 A1* | 3/2007 | Kempe | .................. | G06Q 30/02 705/14.54 |
| 2007/0174701 A1* | 7/2007 | Lee | ........................ | G06F 11/263 714/33 |
| 2010/0287026 A1* | 11/2010 | Smith | ................ | G06Q 30/0253 705/14.51 |
| 2011/0087452 A1* | 4/2011 | Huang | ................ | G06F 11/2284 702/117 |
| 2012/0209728 A1* | 8/2012 | Figg | ........................ | G06Q 10/10 705/14.73 |

(Continued)

OTHER PUBLICATIONS

Ben, "How do I enable a device for testing?", 2018, Unity Support at https://support.unity3d.com/hc/en-us/articles/218324523-How-do-I-enable-a-device-for-testing- (Year: 2018).*

*Primary Examiner* — Hossain M Morshed
(74) *Attorney, Agent, or Firm* — Sheppard Mullin Richter & Hampton LLP

(57) ABSTRACT

Systems, methods, and non-transitory computer-readable media can receive, via a user interface provided to a user, test device information identifying one or more user computing devices as test devices. An advertisement request is received from a first user computing device. A determination is made that the first user computing device is identified as a test device. A test advertisement is transmitted to the first user computing device based on the determination that the first user computing device is identified as a test device.

20 Claims, 7 Drawing Sheets

(56) References Cited

U.S. PATENT DOCUMENTS

| | | | |
|---|---|---|---|
| 2012/0246674 A1* | 9/2012 | Burt | H04N 21/26258 725/32 |
| 2013/0117103 A1* | 5/2013 | Shimizu | G06Q 30/0201 705/14.44 |
| 2013/0212149 A1* | 8/2013 | Frenz | G06F 11/321 709/201 |
| 2014/0074592 A1* | 3/2014 | van Elsas | G06F 8/61 705/14.45 |
| 2015/0095717 A1* | 4/2015 | Frenz | G06F 11/2294 714/46 |
| 2015/0213483 A1* | 7/2015 | Mallon | G06Q 30/0245 705/14.44 |
| 2016/0292718 A1* | 10/2016 | Jain | G06Q 30/0246 |
| 2016/0314491 A1* | 10/2016 | Shani | G06Q 30/0275 |
| 2017/0070764 A1* | 3/2017 | Massoudi | H04N 21/42684 |
| 2017/0213238 A1* | 7/2017 | Bhalgat | G06Q 30/0275 |
| 2017/0372352 A1* | 12/2017 | Riordan | G06Q 30/0246 |
| 2018/0014085 A1* | 1/2018 | Nagasaka | H04N 21/2668 |
| 2018/0048722 A1* | 2/2018 | Fadeev | H04L 67/18 |
| 2018/0124150 A1* | 5/2018 | Myron | H04L 69/16 |
| 2018/0322032 A1* | 11/2018 | Thazhathekalam | G06F 9/44505 |
| 2019/0205698 A1* | 7/2019 | Liu | G06F 16/9535 |

* cited by examiner

400

Receive, via a user interface provided to a user, test device information identifying one or more user computing devices as test devices
402

Receive an advertisement request from a first user computing device
404

Determine that the first user computing device is identified as a test device
406

Transmit a test advertisement to the first user computing device based on the determination that the first user computing device is identified as a test device
408

Receive, via a user interface provided to a user, test device information identifying one or more user computing devices as test devices
502

Receive, via the user interface, a selection of a first advertisement type of a plurality of advertisement types for a first user computing device of the one or more user computing devices
504

Receive an advertisement request from the first user computing device
506

Determine that the first user computing device has been identified as a test device and that the first advertisement type has been requested for the first user computing device
508

Transmit a test advertisement of the first advertisement type to the first user computing device based on the determination that the first user computing device is identified as a test device and that the first advertisement type has been requested for the first user computing device
510

FIGURE 5

SYSTEMS AND METHODS FOR DIGITAL CONTENT TESTING

FIELD OF THE INVENTION

The present technology relates to the field of digital content platforms. More particularly, the present technology relates to techniques for testing digital content, such as advertisements, to be provided to users within computing applications.

BACKGROUND

Today, people often utilize computing devices (or systems) for a wide variety of purposes. Users can use their computing devices to, for example, interact with one another, access content, share content, and create content. In some cases, content may be accessed using computing applications running on computing devices. Content may include media content items, such as images, video, or audio content. Content may also include digital advertisements.

SUMMARY

Various embodiments of the present technology can include systems, methods, and non-transitory computer readable media configured to receive, via a user interface provided to a user, test device information identifying one or more user computing devices as test devices. An advertisement request is received from a first user computing device. A determination is made that the first user computing device is identified as a test device. A test advertisement is transmitted to the first user computing device based on the determination that the first user computing device is identified as a test device.

In an embodiment, a selection of a first advertisement type of a plurality of advertisement types is received via the user interface.

In an embodiment, transmitting the test advertisement to the first user computing device comprises transmitting a test advertisement of the first advertisement type based on the selection of the first advertisement type of the plurality of advertisement types.

In an embodiment, the selection of the first advertisement type causes test advertisements to the first user computing device to conform to the first advertisement type for a predefined period of time.

In an embodiment, each advertisement type of the plurality of advertisement types specifies at least one of: a media type, an aspect ratio, a resolution, a language, or a call to action.

In an embodiment, a selection to enable a test mode for the one or more computing devices identified as test devices is received.

In an embodiment, a determination is made that the test mode is enabled for the first user computing device. Transmitting the test advertisement to the first user computing device is performed further based on the determination that the test mode is enabled for the first user computing device.

In an embodiment, the test advertisement is a real advertisement associated with an actual advertiser.

In an embodiment, the user interface is provided by an advertisement distribution platform.

In an embodiment, the user interface is presented within a web page.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example method, according to an embodiment of the present technology.

FIG. 5 illustrates an example method, according to an embodiment of the present technology.

Figure 1:
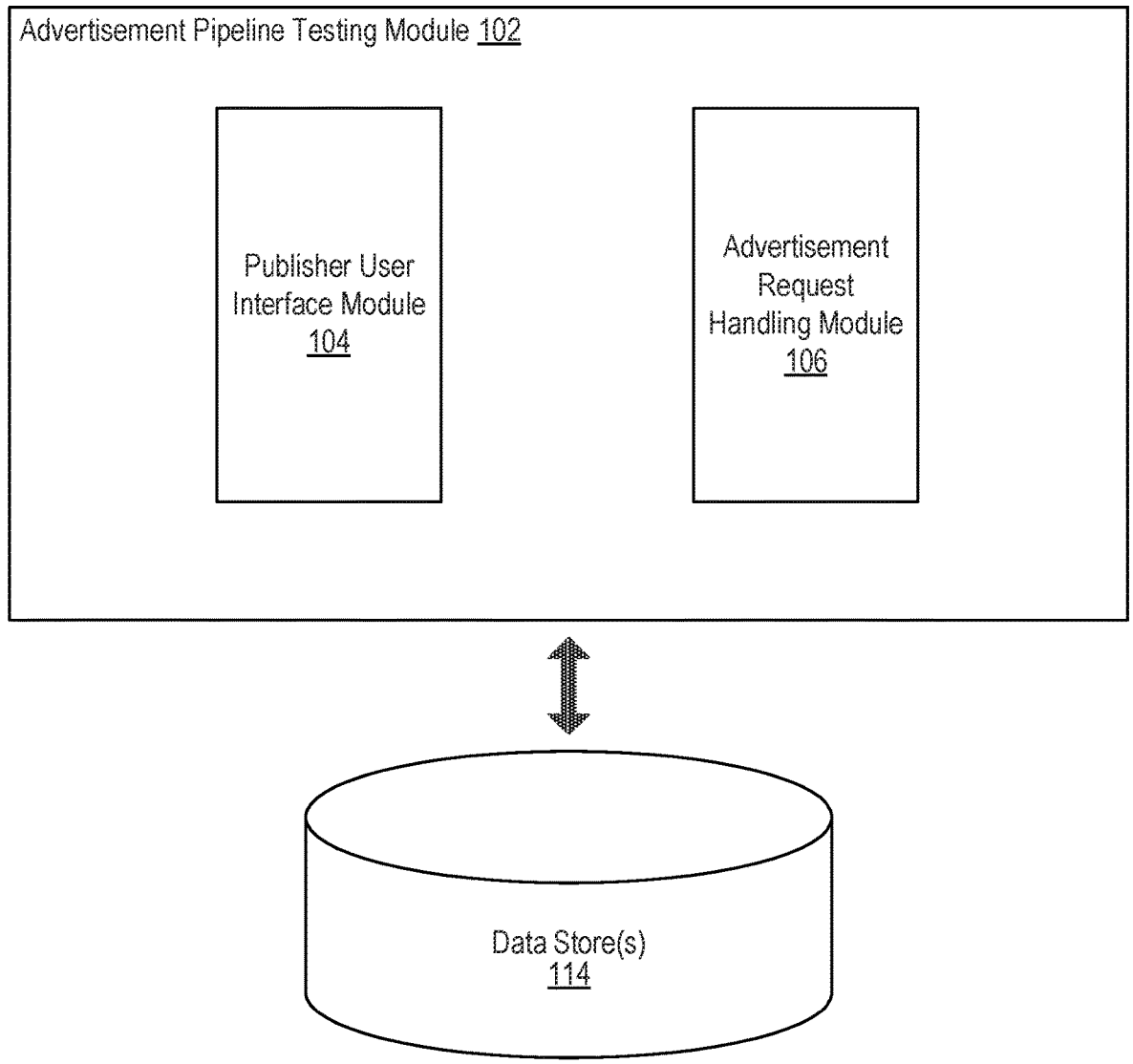
FIG. 1 illustrates an example system including an advertisement pipeline testing module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Digital Content Testing

People often utilize computing devices (or systems) for a wide variety of purposes. Users can use their computing devices to, for example, interact with one another, access content, share content, and create content. In some cases, content may be accessed using computing applications running on computing devices. Content may include media content items, such as images, video, or audio content. Content may also include digital advertisements.

Digital content providers may generate revenue by presenting users with advertisements. For example, a social networking system may generate revenue by placing advertisements amongst other user-generated content, a news website may generate revenue by placing advertisements within news articles, or a gaming application may generate revenue by placing advertisements within a game. Entities that provide a platform for presenting digital advertisements to users may be referred to herein as "publishers." For example, in the example scenarios discussed above, a social networking system, a news website, or a gaming application (and/or entities associated therewith) may all be considered "publishers."

Computing applications may include code to retrieve advertisements from one or more advertisement distribution platforms. For example, a social networking system may be an example of an advertisement distribution platform that has access to a set of advertisements from third party advertisers. The social networking system may seek to increase opportunities for such advertisements to be presented to users. One way to do this is by providing advertisements to other digital content providers for presentation within those content providers' properties. For example, a third party game developer may retrieve advertisements from the social networking system and present those advertisements within a game. The social networking system can be paid by an advertiser for advertisement impressions, including those presented within the third party game developer's game, and the social networking system can, in turn, pay the third party game developer.

Due to the fact that advertisements may play an important role in generating revenue, computing application developers may wish to test functionality of an advertisement pipeline within a computing application before releasing the computing application to the public. However, under conventional approaches, application developers would typically be required to incorporate "test code" into their computing applications to indicate that they are conducting testing. In response to the test code indicating that the application developer is testing a computing application's advertisement pipeline on one or more devices, an advertisement distribution platform, such as a social networking system, can provide test advertisements. However, such conventional approaches are problematic for several reasons. First, any modifications to an application developer's testing (e.g., addition or removal of test devices) typically requires changes to the application code itself, which can be tedious and work-intensive. Furthermore, application developers may accidentally publish computing applications without removing the "test code" that was added for testing purposes. In such scenarios, the now publicly-available application may continue to request test advertisements rather than actual advertisements, and an application developer may not be properly credited for advertisement impressions. As such, publishers may find conventional approaches to be unnecessarily tedious and difficult. Conventional approaches may not be effective in addressing these and other problems arising in computer technology.

An improved approach rooted in computer technology overcomes the foregoing and other disadvantages associated with conventional approaches specifically arising in the realm of computer technology. In general, rather than putting the burden on publishers to incorporate test code in a computing application to conduct advertisement pipeline testing, the presently disclosed technology may allow such testing to be handled server-side by an advertisement distribution platform, such as a social networking system. Publishers may be provided with a user interface (e.g., within a web page presented on a web browser) that the publishers can utilize to identify one or more test devices. The user interface may be provided to publishers by the advertisement distribution platform (e.g., a social networking system). The user interface may also allow publishers to enable or disable advertising pipeline testing on the one or more test devices. When a test mode is enabled, the advertisement distribution platform can transmit test advertisements to the one or more test devices. When a test mode is disabled, the advertisement distribution platform can transmit normal advertisements to the one or more test devices.

When an advertisement distribution platform, such as a social networking system, receives an advertisement request from a user computing device, the advertisement distribution platform can perform a check to determine whether or not the user computing device has been identified as a test device. The advertisement distribution platform can also perform a check to determine whether a test mode is enabled or disabled for the user computing device. Based on these determinations, the advertisement distribution platform can provide the user computing device with a test advertisement or a normal advertisement. Using the disclosed technology, publishers no longer have to modify application code to conduct testing of an advertisement pipeline within a computing application. As such, the publisher is no longer at risk of accidentally publishing or distributing application code that incorporates test code pertaining to advertisement pipeline testing. More details relating to the disclosed technology are provided below.

FIG. 1 illustrates an example system 100 including an advertisement pipeline testing module 102, according to an embodiment of the present technology. The advertisement pipeline testing module 102 can be configured to receive an advertisement request from a user computing device, and determine an appropriate advertisement to provide to the user computing device in response to the advertisement request. This determination may include determining whether a test advertisement or a normal advertisement should be transmitted to the user computing device. As shown in the example of FIG. 1, the advertisement pipeline testing module 102 can include a publisher user interface module 104 and an advertisement request handling module 106. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the advertisement pipeline testing module 102 can be implemented in any suitable combinations.

In some embodiments, the advertisement pipeline testing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the advertisement pipeline testing module 102 can be, in part or in whole, implemented as software running on one or more computing devices or systems, such as on a server system or a client computing device. In some instances, the advertisement pipeline testing module 102 can be, in part or in whole, implemented within or configured to operate in conjunction with or be integrated with a social networking system (or service), such as a social networking system 630 of FIG. 6. Likewise, in some instances, the advertisement pipeline testing module 102 can be, in part or in whole, implemented within or configured to operate in conjunction with or be integrated with a client computing device, such as the user device 610 of FIG. 6. For example, the advertisement pipeline testing module 102 can be implemented as or within a dedicated application (e.g., app), a program, or an applet running on a user computing device or client computing system. The application incorporating or implementing instructions for performing functionality of the advertisement pipeline testing module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The advertisement pipeline testing module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the advertisement pipeline testing module 102. For example, the data store 114 can store test device information for one or more publishers, settings for one or more test devices, and the like. It is contemplated that there can be many variations or other possibilities.

The publisher user interface module 104 can be configured to receive test device information from a publisher. As discussed above, a publisher may include any entity that provides a platform for presenting digital advertisements to users. For example, a publisher may be an application developer that provides users with a computing application that includes advertisements. In an embodiment, the publisher user interface module 104 may provide a user (e.g., a publisher) with a user interface that allows the user to enter test device information identifying one or more user computing devices as test devices. For example, a publisher that is testing a computing application may have one or more mobile devices that the publisher would like to use as test devices. The publisher can utilize the user interface to enter test device information identifying the one or more mobile devices as test devices. Test device information may include device identifiers that can be used to identify a particular computing device as a test device. For example, test device information can include IDFAs (identifiers for advertisers) or AAIDs (Android Advertising IDs). In an embodiment, each publisher may be provided with access to a web page user interface through which the publisher can enter test device information. In an embodiment, each publisher may be limited to a maximum number of test devices (e.g., no more than 50 test devices). In an embodiment, the user interface may be provided by an advertisement distribution platform, such as a social networking system. By providing publishers with this user interface, the advertisement distribution platform can receive and maintain test device information for each publisher, and can process advertisement requests associated with the various publishers based on the test device information.

The user interface may also allow a publisher to enable or disable a test mode for the one or more test devices identified. When the test mode is enabled, an advertisement distribution platform can transmit test advertisements to the one or more test devices. When the test mode is disabled, the advertisement distribution platform can transmit normal advertisements to the one or more test devices. In certain embodiments, test advertisements may be fake advertisements that are not associated with an actual advertiser. In other embodiments, test advertisements may be actual advertisements from an advertiser. However, test advertisements may be distinguished from normal advertisements in that test advertisements are not credited as an advertisement impression for the publisher.

In certain embodiments, the user interface may also allow a publisher to request and/or specify a particular advertisement type for test advertisements being transmitted to one or more test devices. When a publisher is testing an advertisement pipeline in a computing application, the publisher may wish to test different types of advertisements to ensure that they are working correctly within the computing application. As such, the publisher user interface module 104 may provide a publisher with the option to specify desired advertisement features by selecting a particular advertisement type. For example, by selecting a particular advertisement type, the publisher may specify one or more of the following: a type of media for the test advertisement (e.g., image, video, set of images, etc.); media properties for the test advertisement (e.g., aspect ratio, resolution, the language used in the test advertisement); a call to action presented in the test advertisement (e.g., selecting the test advertisement will lead to an option to install an application, or selecting the test advertisement will open a particular web page), etc. In certain embodiments, when a publisher selects a particular advertisement type for a test device, the selection may be applied for a particular period of time (e.g., for the next five minutes, all test advertisements sent to the test device will conform to the selected advertisement type unless a different advertisement type is selected in that time). In certain embodiments, the user interface may also allow the publisher to request and/or specify a particular advertisement scenario for one or more test devices. For example, the publisher may wish to test an error scenario in which no advertisement could be found for a user to ensure that the computing application is able to handle such errors appropriately. The publisher may utilize the user interface to request that an error message be returned indicating that no advertisement could be found.

Figure 2:
FIG. 2 illustrates an example user interface, according to an embodiment of the present technology.

FIG. 2 illustrates an example user interface 200, according to an embodiment of the present technology. The example user interface 200 may, for example, be provided to a publisher by an advertisement distribution platform. Various functions of the example user interface 200 may be carried out by the publisher user interface module 104 of FIG. 1. The user interface 200 presents test device information associated with a particular publisher. For example, a publisher may log into their account to access the user interface 200 and the test device information contained therein. The user interface 200 includes a toggle switch 202 to enable or disable a test mode. When the toggle switch 202 is turned on, and the test mode is enabled, test advertisements are transmitted to one or more test devices associated with the publisher. When the toggle switch 202 is turned off, and the test mode is disabled, the one or more test devices are no longer treated as test devices, and normal advertisements are transmitted. The user interface 200 also includes an option 204 to use real advertisements from actual advertisers as test advertisements.

The user interface 200 includes a device ID entry field 206 to enter a device ID associated with a user computing device to identify the user computing device as a test device for the publisher. A name can also be provided for the user computing device using an entry field 208. Rather than inputting one test device at a time, a list of test devices may be added by uploading a device list (option 210).

The user interface 200 lists one or more test devices 212. The list of test devices is specific to a particular publisher. For example, a particular user computing device may be identified as a test device for a particular publisher (e.g., for a first computing application), but may not be identified as a test device for another publisher (e.g., for a second computing application). Next to each test device is an option that reads "select ad type" (options 214a-c). The option can be selected in order to specify a particular advertisement type for a test device such that test advertisements transmitted to the test device may conform to the selected advertisement type, as will be described in greater detail below with reference to FIG. 3.

Figure 3:
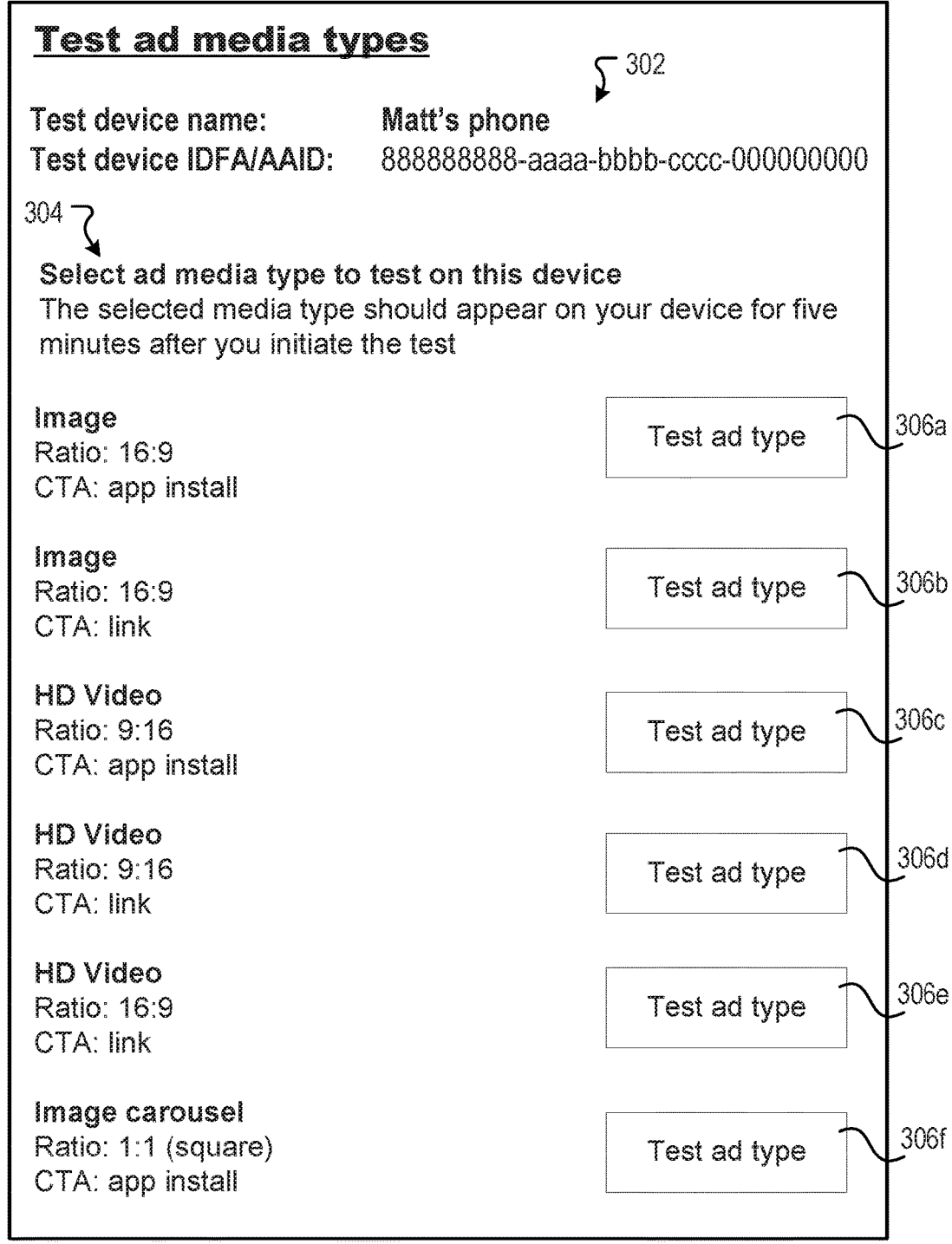
FIG. 3 illustrates an example user interface, according to an embodiment of the present technology.

FIG. 3 illustrates an example user interface 300, according to an embodiment of the present technology. The example user interface 300 shown in FIG. 3 may be displayed in response to a user selecting the option 214a of FIG. 2. Various functions of the example user interface 300 may be carried out by the publisher user interface module 104 of FIG. 1. The example user interface 300 may allow a publisher to select a particular advertisement type for a test device. If a publisher selects a particular advertisement type for a test device, test advertisements sent to the test device may conform to the selected advertisement type. In an embodiment, test advertisements sent to the test device may conform to the selected advertisement type for a set amount of time (e.g., for the next five minutes after the selection is made), or until a different advertisement type is selected.

As discussed above, each advertisement type may specify one or more of: a type of media for the test advertisement (e.g., image, video, set of images, etc.); media properties for the test advertisement (e.g., aspect ratio, resolution, the language used in the test advertisement); a call to action presented in the test advertisement (e.g., selecting the test advertisement will lead to an option to install an application, or selecting the test advertisement will open a particular web page), and the like. In the example interface 300, a user can select a particular advertisement type by selecting the appropriate button (buttons 306a-f).

Returning to FIG. 1, the advertisement request handling module 106 can be configured to receive an advertisement request from a user computing device, and take appropriate action based on the advertisement request. The advertisement request may be associated with a user computing device (e.g., the user computing device that transmitted the advertisement request and/or will present the advertisement). The user computing device may be associated with device ID information that identifies the user computing device. The advertisement request may also be associated with a publisher (e.g., a computing application running on the user computing device within which the advertisement will be presented, and/or one or more entities associated with the computing application). The advertisement request handling module 106 can retrieve test device information associated with the publisher. The test device information may identify one or more user computing devices that have been identified as test devices by the publisher (e.g., using the user interface 200 of FIG. 2). The advertisement request handling module 106 can utilize the device ID information associated with the user computing device to determine whether the user computing device has been identified as a test device by the publisher. If the user computing device has not been identified as a test device, a normal advertisement can be transmitted to the user computing device. If the user computing device has been identified as a test device, a determination can be made as to whether or not the publisher has enabled a test mode for the test device. If the test mode is not enabled, then the user computing device is treated as a normal computing device and a normal advertisement is transmitted to the user computing device. If the test mode is enabled, a test advertisement is transmitted to the user computing device. As discussed above, a test advertisement may be an advertisement that is not associated with an actual advertiser (i.e., a "fake" advertisement), and is used strictly for testing, or may be a real advertisement that is associated with an actual advertiser. If a normal advertisement is transmitted to a user computing device, the advertisement request handling module 106 may credit an advertisement impression to the publisher. However, if a test advertisement is transmitted to the user computing device (either a fake advertisement or a real advertisement), the publisher is not credited with an advertisement impression.

In certain embodiments, if the advertisement request handling module 106 determines that a test advertisement is to be transmitted to a user computing device, the advertisement request handling module 106 can further determine whether a particular advertisement type has been requested for the user computing device. If a particular advertisement type has been requested, then the advertisement request handling module 106 can transmit a test advertisement that conforms to the specified advertisement type.

FIG. 4 illustrates an example method 400, according to an embodiment of the present technology. It should be appreciated that there can be additional, fewer, or alternative steps performed in similar or alternative orders, or in parallel, within the scope of the various embodiments discussed herein unless otherwise stated.

At block 402, the example method 400 can receive, via a user interface provided to a user, test device information identifying one or more user computing devices as test devices. At block 404, the example method 400 can receive an advertisement request from a first user computing device. At block 406, the example method 400 can determine that the first user computing device is identified as a test device. At block 408, the example method 400 can transmit a test advertisement to the first user computing device based on the determination that the first user computing device is identified as a test device.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive, via a user interface provided to a user, test device information identifying one or more user computing devices as test devices. At block 504, the example method 500 can receive, via the user interface, a selection of a first advertisement type of a plurality of advertisement types for a first user computing device of the one or more user computing devices. At block 506, the example method 500 can receive an advertisement request from the first user computing device. At block 508, the example method 500 can determine that the first user computing device has been identified as a test device and that the first advertisement type has been requested for the first user computing device. At block 510, the example method 500 can transmit a test advertisement of the first advertisement type to the first user computing device based on the determination that the first user computing device is identified as a test device and that the first advertisement type has been requested for the first user computing device.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
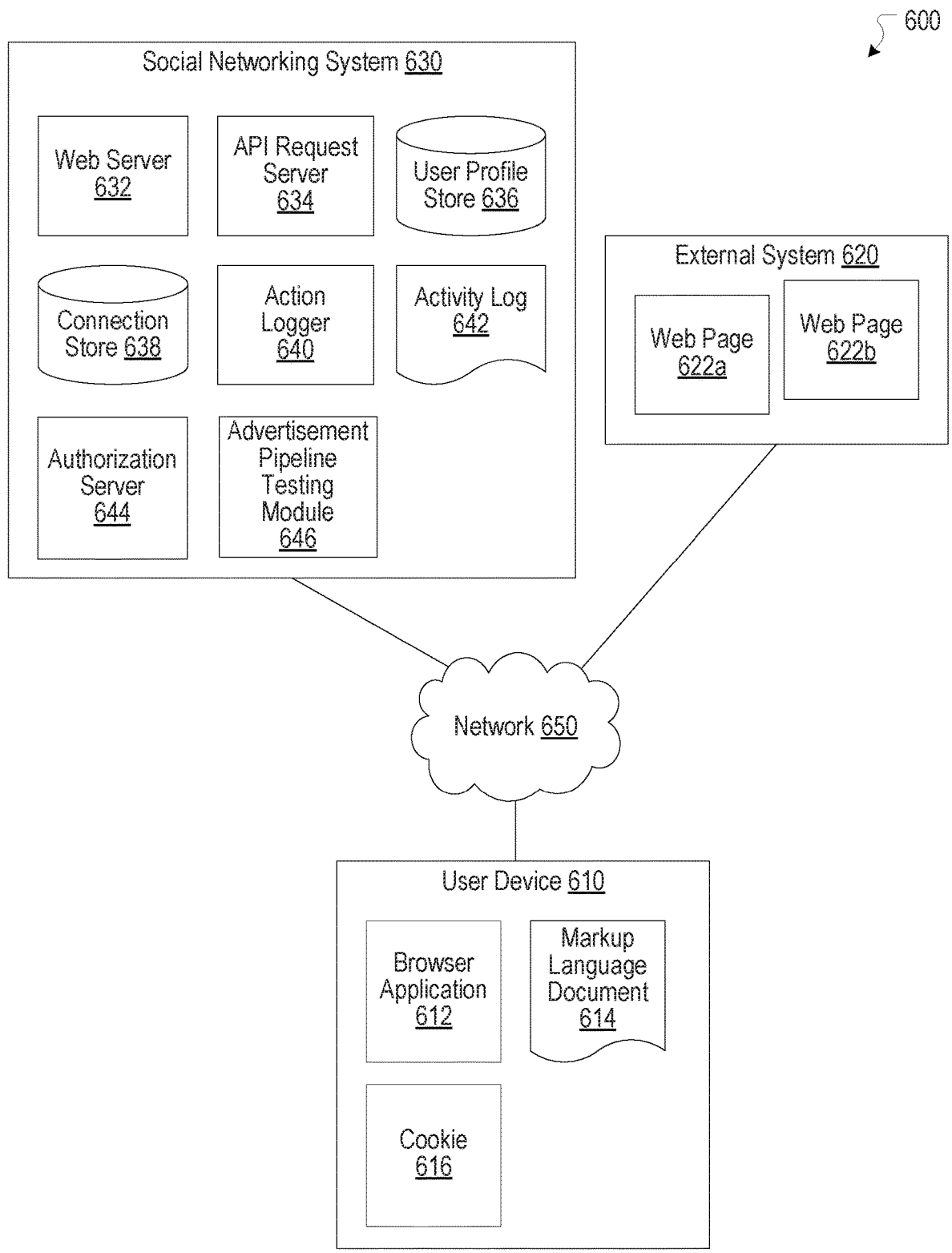
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an advertisement pipeline testing module 646. The advertisement pipeline testing module 646 can, for example, be implemented as the advertisement pipeline testing module 102, as discussed in more detail herein. As discussed previously, it should be appreciated that there can be many variations or other possibilities. For example, in some embodiments, one or more functionalities of the advertisement pipeline testing module 646 can be implemented in the user device 610. As discussed previously, it should be appreciated that there can be many variations or other possibilities.

Hardware Implementation

Figure 7:
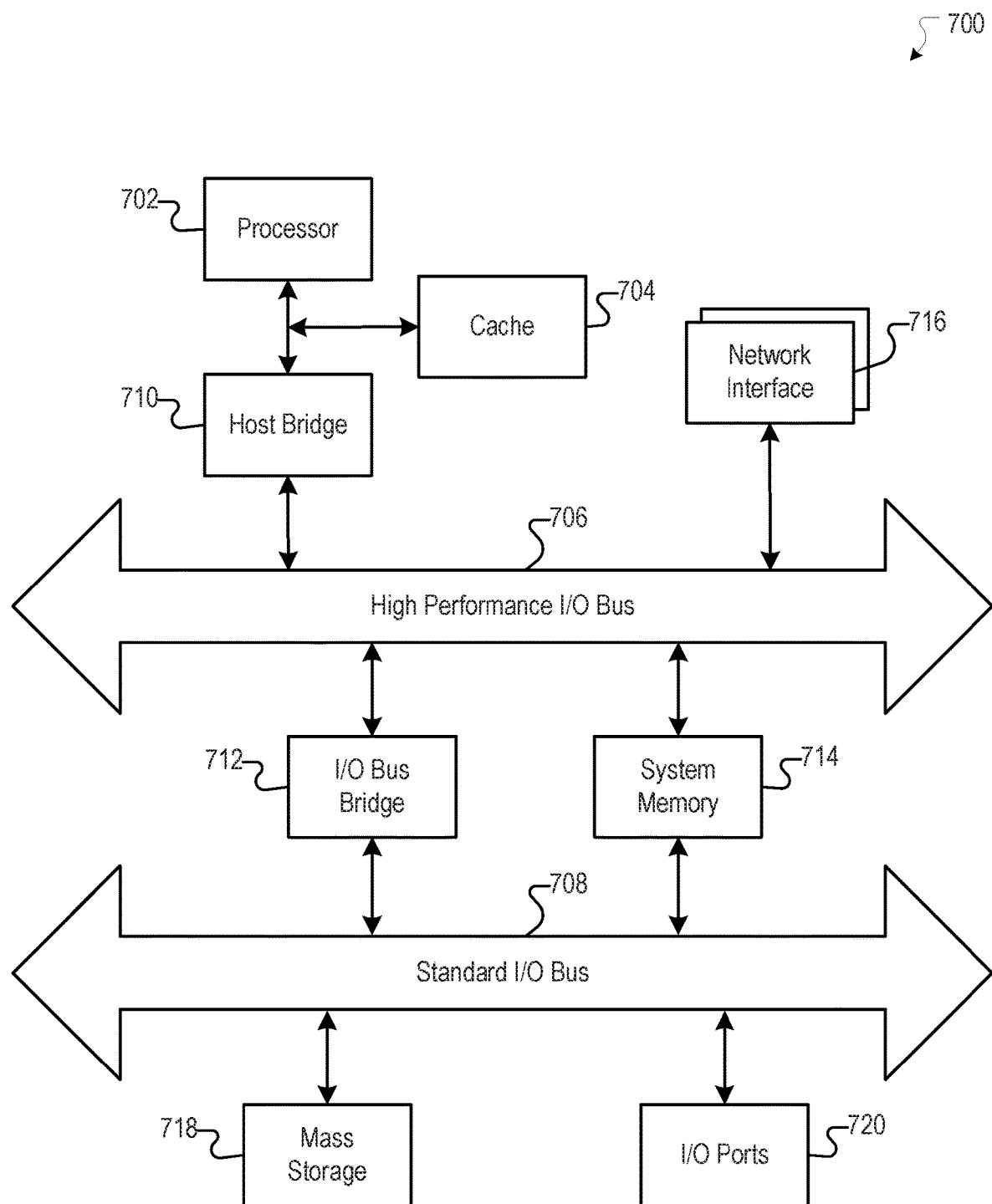
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, test device information identifying one or more user computing devices as test devices;
receiving, by the computing system, a selection of a first advertisement type of a plurality of advertisement types, wherein the first advertisement type specifies a call to action to associate with a test advertisement and wherein the call to action is for installation of an application;
receiving, by the computing system, a first advertisement request from a first user computing device within a predetermined period of time from when the selection of the first advertisement type was received;
determining, by the computing system, that the first user computing device is identified as a test device;
transmitting, by the computing system, the test advertisement of the first advertisement type to the first user computing device based on the determination that the first user computing device is identified as the test device and that the first advertisement request was received within the predetermined period of time; and
transmitting, by the computing system, an error message indicating that no advertisement is found based on a second advertisement request that was received after the predetermined period of time.

2. The computer-implemented method of claim 1, wherein the selection of the first advertisement type of the plurality of advertisement types further specifies the first user computing device is the test device to receive test advertisements of the first advertisement type.

3. The computer-implemented method of claim 1, wherein the transmitting the test advertisement of the first advertisement type is based on the selection of the first advertisement type of the plurality of advertisement types.

4. The computer-implemented method of claim 1, wherein the selection of the first advertisement type causes test advertisements to the first user computing device to conform to the first advertisement type for the predetermined period of time.

5. The computer-implemented method of claim 1, wherein each advertisement type of the plurality of advertisement types further specifies at least one of: a media type, an aspect ratio, a resolution, or a language.

6. The computer-implemented method of claim 1, further comprising:

receiving a selection to enable a test mode for the one or more computing devices identified as test devices, wherein the selection to enable the test mode is made via a user interface that provides the one or more computing devices along with one or more toggle switches to enable or disable the test mode.

7. The computer-implemented method of claim 6, further comprising:
determining that a test mode is enabled for the first user computing device, wherein the transmitting the test advertisement to the first user computing device is performed further based on the determination that the test mode is enabled for the first user computing device.

8. The computer-implemented method of claim 1, wherein the test advertisement is a real advertisement associated with an actual advertiser.

9. The computer-implemented method of claim 1, wherein the test device information is received via a user interface provided by an advertisement distribution platform.

10. The computer-implemented method of claim 9, wherein the test device information is received via a device ID entry field on the user interface or received via an uploaded device list.

11. A system comprising:
at least one processor; and
a memory storing instructions that, when executed by the at least one processor, cause the system to perform a method comprising:
receiving test device information identifying one or more user computing devices as test devices;
receiving a selection of a first advertisement type of a plurality of advertisement types, wherein the first advertisement type specifies a call to action to associate with a test advertisement and wherein the call to action is for installation of an application;
receiving a first advertisement request from a first user computing device within a predetermined period of time from when the selection of the first advertisement type was received;
determining that the first user computing device is identified as a test device;
transmitting the test advertisement of the first advertisement type to the first user computing device based on the determination that the first user computing device is identified as the test device and that the first advertisement request was received within the predetermined period of time; and
transmitting an error message indicating that no advertisement is found based on a second advertisement request that was received after the predetermined period of time.

12. The system of claim 11, wherein the selection of the first advertisement type of the plurality of advertisement types further specifies the first user computing device is the test device to receive test advertisements of the first advertisement type.

13. The system of claim 11, wherein the transmitting the test advertisement of the first advertisement type is based on the selection of the first advertisement type of the plurality of advertisement types.

14. The system of claim 11, wherein the selection of the first advertisement type causes test advertisements to the first user computing device to conform to the first advertisement type for the predetermined period of time.

15. The system of claim 11, wherein each advertisement type of the plurality of advertisement types further specifies at least one of: a media type, an aspect ratio, a resolution, or a language.

16. A non-transitory computer-readable storage medium including instructions that, when executed by at least one processor of a computing system, cause the computing system to perform a method comprising:
- receiving test device information identifying one or more user computing devices as test devices;
- receiving a selection of a first advertisement type of a plurality of advertisement types, wherein the first advertisement type specifies a call to action to associate with a test advertisement and wherein the call to action is for installation of an application;
- receiving a first advertisement request from a first user computing device within a predetermined period of time from when the selection of the first advertisement type was received;
- determining that the first user computing device is identified as a test device;
- transmitting the test advertisement of the first advertisement type to the first user computing device based on the determination that the first user computing device is identified as the test device and that the first advertisement request was received within the predetermined period of time; and
- transmitting an error message indicating that no advertisement is found based on a second advertisement request that was received after the predetermined period of time.

17. The non-transitory computer-readable storage medium of claim 16, wherein the selection of the first advertisement type of the plurality of advertisement types further specifies the first user computing device is the test device to receive test advertisements of the first advertisement type.

18. The non-transitory computer-readable storage medium of claim 16, wherein the transmitting the test advertisement of the first advertisement type is based on the selection of the first advertisement type of the plurality of advertisement types.

19. The non-transitory computer-readable storage medium of claim 16, wherein the selection of the first advertisement type causes test advertisements to the first user computing device to conform to the first advertisement type for the predetermined period of time.

20. The non-transitory computer-readable storage medium of claim 16, wherein each advertisement type of the plurality of advertisement types further specifies at least one of: a media type, an aspect ratio, a resolution, or a language.

* * * * *